US005550524A

United States Patent [19]

Zimmerman

[11] Patent Number: 5,550,524

[45] Date of Patent: Aug. 27, 1996

[54] THERMOSTAT RANGE LIMIT DEVICE

[76] Inventor: Ralph W. Zimmerman, 2807 Rabbit Hill, Tallahassee, Fla. 32312

[21] Appl. No.: 251,401

[22] Filed: May 31, 1994

[51] Int. Cl.[6] .......................... H01H 37/00; G05D 23/00; G09F 9/00; G05G 1/04

[52] U.S. Cl. ................................ 337/1; 337/82; 337/360; 236/47; 236/94; 116/311; 116/324; 74/526

[58] Field of Search ............................. 337/360, 82, 323, 337/392, 84, 303; 236/DIG. 1, 91 D, 91 E, 94, 47; 116/311, 324, 296, 297; 74/526, 553

[56] References Cited

U.S. PATENT DOCUMENTS

| | | | |
|---|---|---|---|
| 1,638,582 | 8/1927 | Houch . | |
| 3,452,616 | 7/1969 | Nelson | 74/526 |
| 3,670,284 | 6/1972 | Fortier | 337/360 |
| 3,999,158 | 12/1976 | Rae | 337/360 |
| 4,090,165 | 5/1978 | Rae | 337/360 |
| 4,223,291 | 9/1980 | Teichert | 337/303 |
| 4,455,886 | 6/1984 | Schmitt | 74/531 |
| 4,639,709 | 1/1987 | Koets | 337/360 |

*Primary Examiner*—Leo P. Picard
*Assistant Examiner*—Stephen T. Ryan
*Attorney, Agent, or Firm*—Carnes, Cona, Dixon

[57] ABSTRACT

An adjustable thermostat range limit apparatus consists of a base member having a pair of adjustable temperature limit means. The thermostat range limit apparatus is attached in the proximity of a conventional thermostat so that the adjustable temperature limit means can come into contact with the temperature control level of a conventional thermostat. These adjustable temperature limit means will provide for a restriction in the temperature range in which the temperature control lever can be set.

16 Claims, 3 Drawing Sheets

THERMOSTAT RANGE LIMIT DEVICE

BACKGROUND OF THE INVENTION

Thermostats that control heating and air conditioning units typically have a temperature control range of forty to sixty degrees. It is often desirable to restrict the temperature range within which the thermostat can be operated. Toward this end, thermostat range limit devices have been proposed.

Examples of such devices are found in U.S. Pat. No. 4,639,709 issued to Koets and U.S. Pat. Nos. 4,090,165 and 3,999,158 issued to Rae. These devices narrow the range within which the thermostat control lever can operate and thereby restrict the range within which the temperature setting swings. These devices are relatively simple and efficient. However, they do suffer from major drawbacks.

The thermostat must be constrUCted so that it receives the particular range limit device. Therefore, in order to make use of these range limit devices, the thermostat housing must be able to receive the device. Otherwise, the housing must be retrofitted with the receiving means.

Furthermore, each of the above devices requires a partial disassembly of the thermostat housing in order to reset the range. Additionally, the two devices proposed by Rae require the storage of several parts to be used for the various ranges desired. Such parts will tend to be lost over time rendering the device useless.

The above drawbacks associated with the current range limit devices, will discourage installation and use of the devices. If a thermostat's housing is unable to receive a temperature range limit device, a person will be loath to pay for a retrofit. If the device is installed, many people will disassemble the thermostat housing in order to utilize the device.

What is needed is a thermostat range limit device that does not require any particular receiving means within the thermostat housing. Such a device must be able to be installed on any thermostat without the need for any alteration to the thermostat. This device must be easy to use without the need to partially disassemble the housing. Ideally, this device should be inexpensive to manufacture.

SUMMARY OF THE INVENTION

This invention provides for a thermostat range limit device that will allow for an easy means of limiting the temperature range within which a thermostat can be operated. The temperature range limit device of the present invention includes a base, a high temperature limit means, and a low temperature limit means.

The base is attached to the top, side, or bottom of a conventional thermostat, depending on whether the thermostat's temperature control lever is top, side, or bottom mounted. The high temperature limit means and the low temperature limit means are releasably attachable to the base. The high temperature limit means can be placed along the base to correspond to the highest desired temperature to which the thermostat can be set. The low temperature limit means can be placed along the base to correspond to the lowest desired temperature to which the thermostat can be set.

The high temperature limit means, which sets the high temperature limit, and the low temperature limit means, which sets the low temperature limit, block further advancement of the temperature control lever beyond the desired settings. The temperature control lever operates between the high temperature limit means and the low temperature limit means. Once the temperature range is set by the respective temperature limit means, the temperature lever cannot be pushed outside the range.

Therefore, it is the object of the present invention to provide for a thermostat range limit device that is easy to install onto any conventional thermostat without the need to retrofit the thermostat housing.

It is another object of the present invention to provide for a thermostat range limit device that will permit easy access to and change of the range limit settings without the need to disassemble the thermostat housing.

It is another object of the present invention to provide for a thermostat range limit device that will be easy and convenient to reset in the dark or by person that are presbyopic or have deficient eye sight.

It is another object of the present invention to provide for a thermostat range limit device that is inexpensive to fabricate and durable in operation.

BRIEF DESCRIPTION OF THE DRAWINGS

Similar reference numerals refer to similar parts throughout the several views of the drawings.

DESCRIPTION OF THE PREFERRED EMBODIMENTS

Figure 1A:
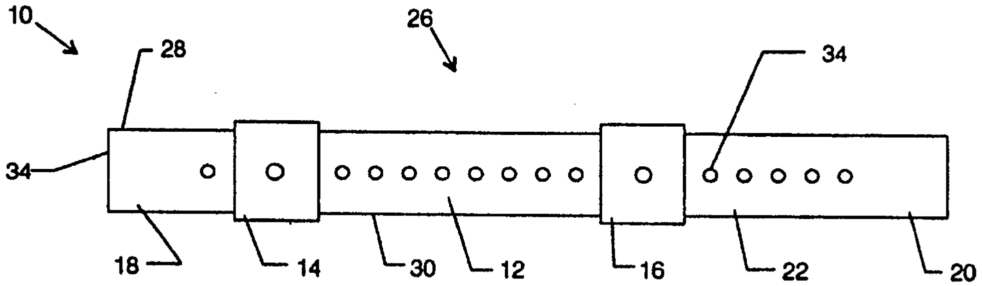
FIG. 1*a* is a front elevation view of one embodiment of the thermostat range limit device of the present invention.

FIGS. 1*a*–2*b* illustrate the various views of the present invention. As seen in these figures, the thermostat range limit device 10 of the present invention consists of a base 12, a high temperature limit means 14, and a low temperature limit means 16.

The base includes a front side 22, a back side 24, a first end 18 and a second end 20. The base further includes a top edge 28, bottom edge 30, and a middle portion 26.

Centrally located on middle portion of the base is an opening means for receiving the securing means 32. In one embodiment, the opening means in the middle portion of the base is a plurality of evenly spaced holes 34 (illustrated in FIG. 1). Optionally, the opening means can include a groove 36 which extends from the front side 22 to the back side 24 of the base. This groove 36 is illustrated as the opening means in FIG. 1*b*.

A first attachment means 38 is located on the back side at the first end of the base and a second attachment means 40 is located on the back side at the second end of the base. The first and second ends of the back side of the base are securely fastened to the wall by utilizing the first and second attachment means 38, 40. The base of the thermostat range limit device is positioned in the proximity of the conventional thermostat housing so that the high or low temperature limit means will be able to contact the thermostat's temperature control lever.

Figure 9:
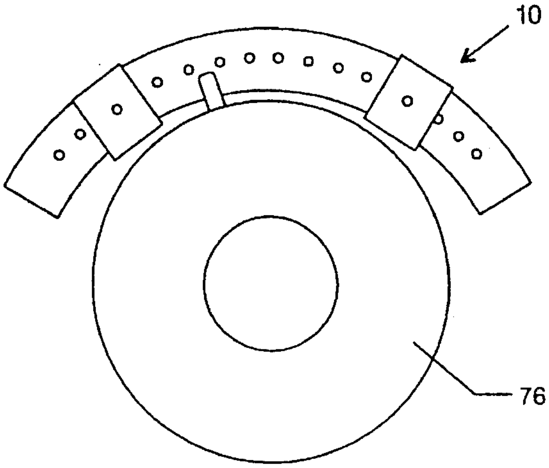
FIG. 9 is a front elevation view of the thermostat range limit device of FIG. 8 installed to the top of a conventional thermostat.

Alternatively, the base 12 can be directly fastened to the housing of the conventional thermostat. In order to provide for this type of arrangement, the base of the thermostat range limit device is altered. This alteration is illustrated in FIG. 2*b*. As seen in FIG. 2*b*, the back side 24 of the base can include a first set of grooves 42 and a second set of grooves 44. The first set of grooves 42 is located near the first end 18 of the base and next to the first attachment means 38. The second set of grooves 44 is located near the second end 20 of the base and next to the second attachment means 40. Both the first and second set of grooves extend from the top edge 28 to the bottom edge of the base. This configuration will permit the base to bend easily at the location of the first and second set of grooves. This bending will provide for the first and second ends to be perpendicular to the middle portion 26 of the base. This arrangement will provide for the first and second ends of the base to be attached to the side walls of a conventional thermostat, while the middle portion faces the thermostat's temperature control lever. An example of the utilization of the thermostat range limit device having a first set of grooves and a second set of grooves on the back side of the base is illustrated in FIG. 9.

The high temperature limit means 14 and the low temperature limit means 16 are secured to the base. Both the high and low temperature limit means can slide freely on the base once the securing means are removed. The various embodiments used for the high temperature limit means are illustrated in further detail in FIGS. 3*a*–3*c*. The low temperature limit means is not separately illustrated in that it is identical in shape, size, structure, and design as the high temperature limit means.

Figure 4A:
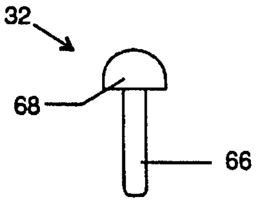
FIGS. 4*a* and 4*b* are side views of the securing means used in the various embodiments of the thermostat range limit device of present invention.
Figure 4B:
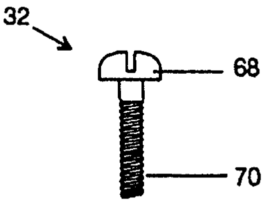

FIGS. 4*a*–4*c* are the various embodiments of high temperature limit means that can be utilized with the thermostat range limit device illustrated in FIGS. 1*a*–2*b*.

Figure 3A:
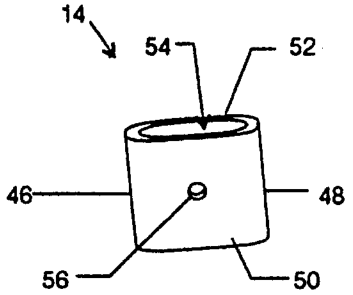
FIGS. 3*a*–3*c* are isometric views of the temperature limit means which can be used in the various embodiments of the thermostat range limit device of the present invention.

FIG. 3*a* illustrates the first embodiment of the high temperature limit means. As seen in this figure, the high temperature limit means has a first curve end 46 and a second curved end 48. A first wall 50 and a second wall 52, which are parallel to each other, are located between the first curved end and the second curved end. This first embodiment of the high temperature limit means further includes a hollow center 54. This hollow center receives the base of the thermostat range limit device. A first hole 56 and a second hole (not illustrated) are centrally located on the first and second wall, respectively. The first and second holes are aligned with each other and receive the securing means.

In order to adjust the temperature range of the thermostat range limit device when the first embodiment of the temperature limit means is used, the securing means is first removed. This will unlock the temperature limit means and allow it to slide freely on the base. Once the desired temperature range is selected, the securing means is inserted through the first hole, the opening means provide in the base (plurality of holes illustrated in FIG. 1*a* or the groove illustrated in FIG. 1*b*) and the second hole. This will provide for the high and low temperature limit means to be in a fixed position. This securing means is illustrated in FIGS. 4*a* and 4*b*.

Figure 3B:
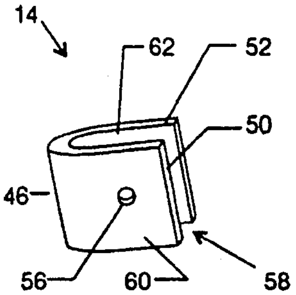

As seen in FIG. 3*b* the high temperature limit means is U-shaped. This U-shape limit means has a first curved end 46, an open end 58, a first wall 50, and a second wall 52. The first wall has a first side (not illustrated) and a second side 60. The second wall has a first side (not illustrated) and a second side 62. The first side of the first wall faces the second side 62 of the second wall. This first side of the first wall and the second side of the second wall constitutes the interior of the limit means while the second side of the first wall and the first side of the second wall constitutes the exterior of the limit means. A first hole 56 and a second hole (not illustrated) are centrally located in the first and second wall, respectfully. The first hole is aligned with the second hole.

The high temperature limit means and the low temperature limit means are releasably attachable to the base. In order to attach and adjust the temperature limit means to the base, the open end 58 of the temperature limit means is straddled onto the front and back sides of the base. This causes the second side of the first wall and the first side of the second wall to directly contact the base. A force is exerted on the exterior of the curved end of the U-shape temperature limit means to provide for the interior of the curved end to communicate with the top edge of the base. Upon attachment to the base, the temperature limit means can slide freely about the base. Once the desired temperature is obtained for the high and low temperature limit means, the securing means is inserted into the first hole, the opening means, and the second hole in order to provide for the high and low temperature limit means to be in a locked position. This securing means is illustrated in further detail in FIG. 5.

Figure 3C:
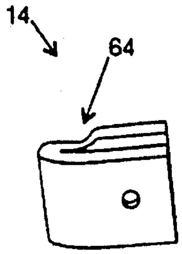

A third embodiment of the temperature limit means is illustrated in FIG. 3*c*. This embodiment is a slight variation of the second embodiment of the temperature limit means. As seen in this figure, the difference resides only in that the second wall, attached to the curved top end of the temperature limit means, is crimped. This crimped portion 64 provides a gripping area for the user and will provide a facilitation in the adjusting of the temperature limiting means. This embodiment of the temperature limit means operates in the same manner as the temperature limit means illustrated and discussed in FIG. 3*b*.

The securing means that can be used in the embodiment illustrated in FIG. 1*a* is illustrated in FIG. 4*a*. As seen in this figure, the securing means 32 has a top portion and a bottom portion. The bottom portion is an elongated solid rod 66 which has a smaller diameter than the holes located on the base and the holes located on the high and low temperature limit means. The top portion 68 of the securing means has a solid semi-circular shape. The top portion also includes a diameter which is larger than the diameter of the bottom portion of the securing means, the holes located on the base, and the holes located on the high and low temperature limit means. The bottom portion of the securing means is received in the holes of the base and the holes of the high and low temperature limit means. This securing means maintains the high and low temperature limit means in the desired location.

Figure 1B:
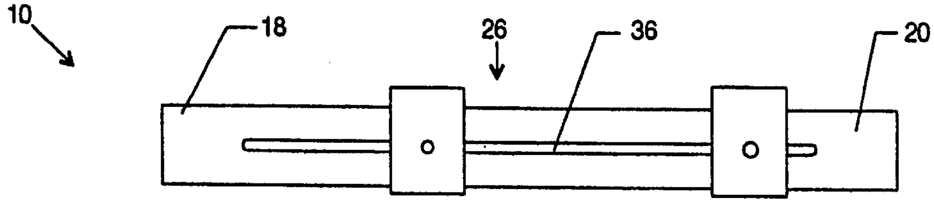
FIG. 1*b* is a front elevation view of the base of the thermostat range limit device having an altered center area.

The embodiment illustrated in FIG. 4a can be changed in order to provide for a securing means to be utilized with the embodiment illustrated in FIG. 1b. As seen in FIG. 4b, the securing means 32 consists of a semi-circular shaped top 68. Attached to the flat surface of the top is an elongated threaded rod 70. The bottom portion of the securing means is received in the holes of the high and low temperature limit means as well as in the groove. The teeth located on the threaded rod will cut slightly into the walls of the groove to provide for the high and low temperature limit means to be affixed on the base in a locked position.

Figure 5:
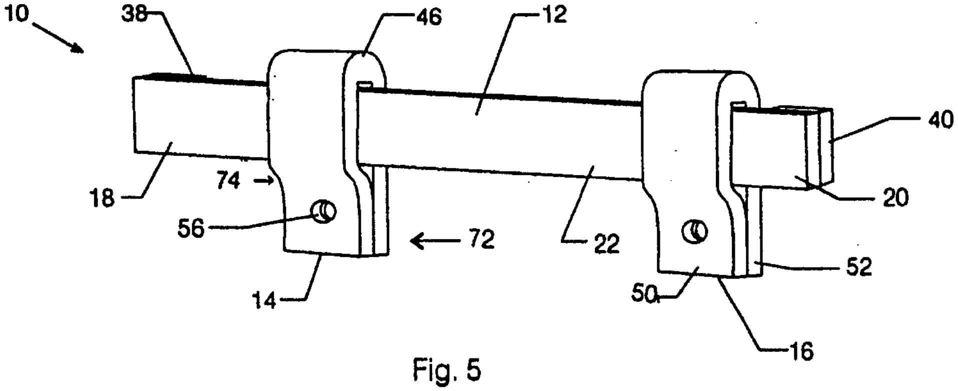
FIG. 5 is a perspective view of another embodiment of the present invention.

It is noted that only one securing means is illustrated in FIG. 4. This is because the securing means used to lock the high and low temperature limit means in a fixed position are identical in shape, structure, size and design The preferred embodiment of the thermostat range limit device is illustrated in FIG. 5. In this embodiment, the thermostat range limit device 10 includes a base 12, a high temperature limit means 14, and a low temperature limit means 16.

The base include a front side 22, a back side (not illustrated), a first end 18 and a second end 20. Located on the back side at the first end is a first attachment means 38 and located on the back side at the second end is a second attachment means 40.

The high temperature limit means 14 and the low temperature limit means 16 are secured to the base. As illustrated in this figure, the high and low temperature limit means are identical in shape, size, and design.

Each temperature limit means further include a first wall 50, a second wall 52, a curved top end 46 and a bottom area 72. A first hole 56 and a second hole (not illustrated) are located on the bottom area of the first and second walls, respectively. The first and second holes are co-aligned with each other. As further illustrated, the bottom area of the first wall has an indented portion 74. This indentation is in the direction of the second wall, causing the bottom area of the first wall to be concave.

The high and low temperature limit means are releasably attachable to the base. In order to attach the limit means to the base, the first and second sides of the temperature limit means is straddled onto the front and back side of the base. Each temperature limit means is pushed down until the inside of the curved top portions contacts the top edge (not labeled in this figure) of the base. This causes the bottom area of the temperature limit means to extend beyond the base.

The high and low temperature limit means are then able to slide freely along the base. The high and low temperature limit means are then situated on the base at the desired location (dependent on the desired temperature). A securing means (illustrated in FIGS. 4a and 4b) is inserted into the first and second holes. During the process of inserting the securing means into the first and second holes, the first and second walls are moved inwardly. This inherently causes the first and second walls to tighten around the base. The process of inserting the securing means into the first and second holes is continued until the first and second holes are in direct contact with each other. This contact will provide for the temperature limit means to fit securely around the base.

It is noted that if the securing means illustrated in FIG. 4b is used, then the first and second holes on the high and low temperature limit means will be threaded.

The attaching means used in the embodiments illustrated in FIGS. 1a, 1b, and 5 can include a variety of conventional attaching elements, such as, but not limited to, screws, adhesives, double-face gluable pad, cooperating fabric hook and fabric loop material (Velcro), and any other commercially available attachment means.

Figure 2A:
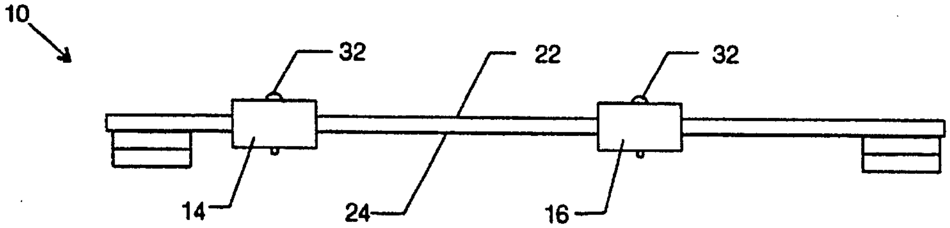
FIG. 2*a* is a side elevation view of one embodiment of the thermostat range limit device of the present invention.
Figure 2B:
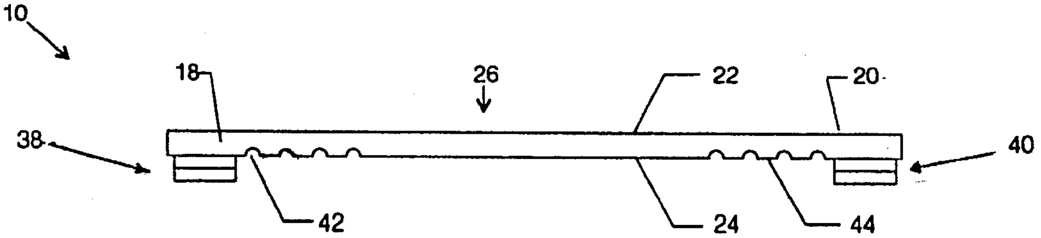
FIG. 2*b* is an alternative side view of the base of the thermostat range/limit device of the present invention.

The attachment means illustrated in FIGS. 2a and 2b is cooperating fabric hook and loop material. As shown in these figures, cooperating fabric hook material is attached to the back side of the base, while the cooperating fabric hook material would be attached to the wall.

Figure 6:
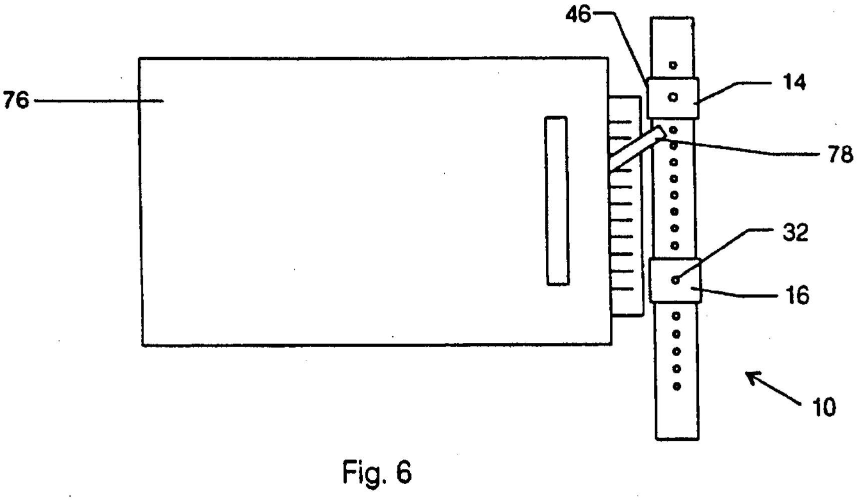
FIG. 6 is a front elevation view of the embodiment of FIG. 1*a* of the thermostat range limit device of the present invention installed parallel to the side of a conventional thermostat.

It order to utilize the thermostat range limit device of the present invention as illustrated in FIG. 6, the attachment means, located on the back of the base, is attached to the wall in the proximity of a conventional thermostat 76. It is noted that the curved ends 46 of the high and low temperature limit means face the conventional thermostat device. The base is attached parallel to the thermostat so that the limit means can contact the temperature control lever 78. The high and low temperature limit means are aligned with the respective temperatures desired. The securing means 32 is then inserted into the holes of the base and the holes of the high and low temperature limit means, thereby locking the limit means into a fixed position and allowing the thermostat range limit device 10 to be utilized.

The thermostat range limit device can be readjusted at any time. In order to do so, the securing means are removed from the high and low temperature limit means. The high and low temperature limit means can then slide freely along the base. Once the new desired temperature settings are obtained, the securing means are inserted into the holes of the base and the holes of the high and low temperature limit means. Thus locking the limit means into a fixed position.

Figure 7:
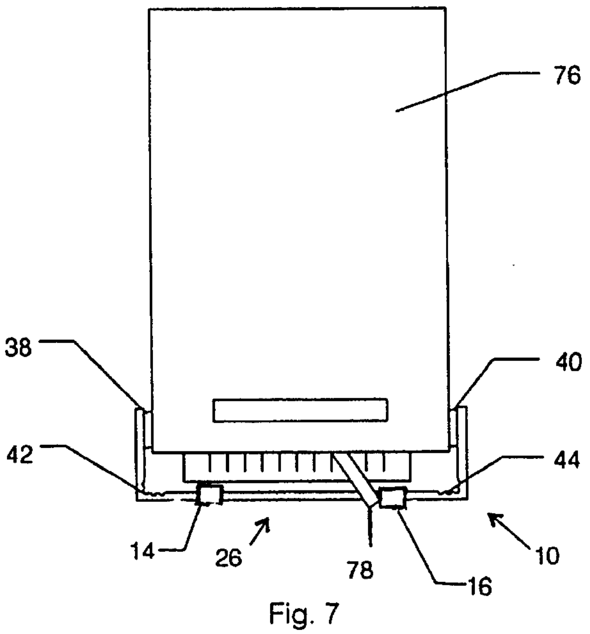
FIG. 7 is a front elevation view of the thermostat range limit device of the present invention attached to the bottom of a conventional thermostat.

The thermostat limit device can be attached directly to the thermostat. This attachment is illustrated in FIG. 7. As is seen in this figure, the embodiment illustrated in FIG. 2b is attached to the side walls of a conventional thermostat. It order to secure the thermostat range limit device to the conventional thermostat, the first and second ends of the base are bent inwardly. The bending occurs at the location of the first and second set of grooves 42,44. The attachment means (38,40) located on the back of the base, is then affixed to the side walls of the conventional thermostat 76. The middle portion 26 of the base is parallel to the thermostat so that the high and low temperature limit means (14, 16) can contact the temperature control lever 78. The high and low temperature limit means are aligned with the respective temperatures desired. The securing means is then inserted into the holes of the base and the holes of the high and low temperature limit means, thereby locking the limit means into a fixed position and allowing the thermostat range limit device 10 to be utilized.

In order to accommodate the various shapes that are utilized with conventional thermostats, the base of the thermostat range limit device of the various embodiments illustrated in FIGS. 1a, 1b, and 5 can be adjusted. One example of such an alteration is illustrated in FIGS. 8 and 9.

Figure 8:
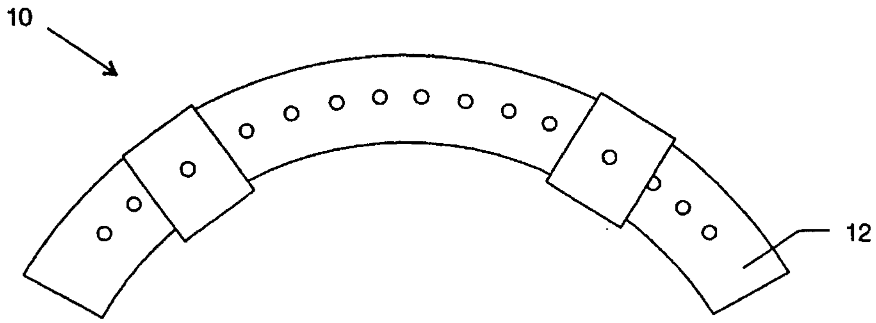
FIG. 8 is a front elevation view of another embodiment of the thermostat range limit device of the present invention.

The difference between the embodiment illustrated in FIGS. 1a, 1b, and 5 and the embodiment illustrated in FIGS. 8 and 9 resides only in the shape of the base. As illustrated, the shape of the base 12 can be altered to conform to the shape of any conventional thermostat. This figure shows that the base is arched. The attachment of the thermostat range limit device 10 is in the proximity of the conventional thermostat device 76. This attachment is done in the same manner as discussed and illustrated in the previous figures.

While the invention has been particularly shown and described with reference to an embodiment thereof, it will be understood by those skilled in the art that various changes in form and detail may be made without departing from the spirit and scope of the invention.

I claim:

1. A thermostat range limiting device for limiting the travel of a temperature lever on a thermostat mounted on a wall comprising in combination:

a base having a first end, a second end, a front side, a back side, and a middle portion located between said first end and said second end;

a first receiving means extends from said first end to said second end and extends through said base;

a first attachment means is located on said back side at said first end, and a second attachment means is located on said back side at said second end for securing said base to the wall;

a first temperature limit means and a second temperature limit means are in slidable communication with said base for limiting high and low temperature settings, respectively of the temperature lever on said thermostat, said first temperature limit means and said second temperature limit means are adapted to limit travel of said temperature lever on said thermostat;

a second receiving means extends centrally through said first temperature limit means and is adapted to be aligned with said first receiving means;

a third receiving means extends centrally through said second temperature limit means and is adapted to be aligned with said first receiving means;

a first securement means extends through said second receiving means and said first receiving means for providing said first temperature limit means to be in a locked and secured position on said base and a second securement means extends through said third receiving means and said first receiving means for providing said second temperature limit means to be in a locked and secured position on said base; and said first securement means and said second securement means provides for said first temperature limit means and said second temperature limit means to be maintained in a fixed position on said base when said base is vertically displace and when said base is horizontally displaced.

2. A thermostat range limit device as in claim 1 wherein said back side of said base further includes a first bending region located next to said first attachment means, and a second bending region located next to said second attachment means, and said first bending region and said second bending region enables said first end and said second end to be bent.

3. A thermostat range limit device as in claim 2 wherein said first bending region includes a first set of grooves and said second bending region includes a second set of grooves.

4. A thermostat range limit device as in claim 1 wherein said first temperature limit means and said second temperature limit means each include a curved top portion and a curved bottom portion, a first side wall is located between said curved top portion and said curved bottom portion, and a second wall is parallel to said first wall and is located between said curved top portion and said curved bottom portion for providing a hollow center to be located between said first wall and said second wall, said hollow center receives said base, and said second receiving means extends centrally through said first wall and said second wall.

5. A thermostat range limit device as in claim 1 wherein said first receiving means comprises a plurality of evenly spaced holes, said second receiving means is a first hole, and said third receiving means is a second hole.

6. A thermostat range limit device as in claim 1 wherein said first receiving means is a groove and said groove extends from said front side to said back side.

7. A thermostat range limit device as in claim 1 wherein said first temperature limit means and said second temperature limit means are U-shaped.

8. A thermostat range limit device as in claim 7 wherein said first temperature limit means and said second temperature limit means each includes a curved closed end, an opened end, a first wall extends downwardly from said curved end ands a second wall, parallel to said first wall extends downwardly from said curved closed end for providing said base to be received between said first wall and said second wall, said first receiving means is a plurality of evenly spaced holes which extend through the base, said second receiving means and said third receiving means include a first hole that extends through said first wall and a second hole that extends through said second wall, said first hole and said second hole is adapted to align with one of said plurality of evenly spaced holes.

9. A thermostat range limit device as in claim 1 wherein said base has a rectangular shape.

10. A thermostat range limit device as in claim 1 wherein said base is arcuate shaped.

11. A thermostat range limit device as in claim 1 wherein said first receiving means comprises a plurality of evenly spaced threaded holes, said second receiving means is a first threaded hole, said third receiving means is a second threaded hole, and said first securement means and said second securement means include threaded pins or screws.

12. A thermostat range limit device as in claim 8 wherein said each first wall of said first temperature limit means and said second temperature limit means include a crimped portion which is indented inwardly towards said second wall.

13. A thermostat range limit device as in claim 5 wherein said first securing means and said second securing means is a pin having a shaft and a top.

14. A thermostat range limit device as in claim 2 wherein said first receiving means comprises a plurality of evenly spaced holes, said second receiving means is a first hole, said third receiving means is a second hole, and said first securement means is a first pin and said and said second securement means is a second pin.

15. A thermostat range limit device as in claim 14 wherein said plurality of evenly spaced holes are threaded, said first receiving means is threaded, said second receiving means is threaded, said first pin includes a first threaded shaft, and said second pin includes a second threaded shaft.

16. A thermostat range limit device for limiting the travel of a temperature lever on a thermostat mounted on a wall comprising in combination:

a base having a first end, a second end, a front side, a back side, and a middle portion located between said first end and said second end;

a first attachment means is located on said back side at said first end, and a second attachment means is located on said back side at said second end for securing said base to the wall;

a first temperature limit means and a second temperature limit means straddle said base and extend outwardly and downwardly from said base, said first temperature limit means and said second temperature limit means are in slidable communication with said base for limiting high and low temperature settings, respectively of the temperature lever on said thermostat, said first temperature limit means and said second temperature limit means are adapted to limit travel of said temperature lever on said thermostat;

a first receiving means extends through said first temperature limit means;

a second receiving means extends through said second temperature limit means;

a first securement means extends through said first receiving means and below said base for providing said first temperature limit means to be in a locked and secured position on said base and a second securement means extends through said second receiving means and below said base for providing said second temperature limit means to be in a locked and secured position on said base; and said first securement means and said second securement means provides for said first temperature limit means and said second temperature limit means to be maintained in a fixed position on said base when said base is vertically displaced or said base is horizontally displaced.

* * * * *